UNITED STATES PATENT OFFICE.

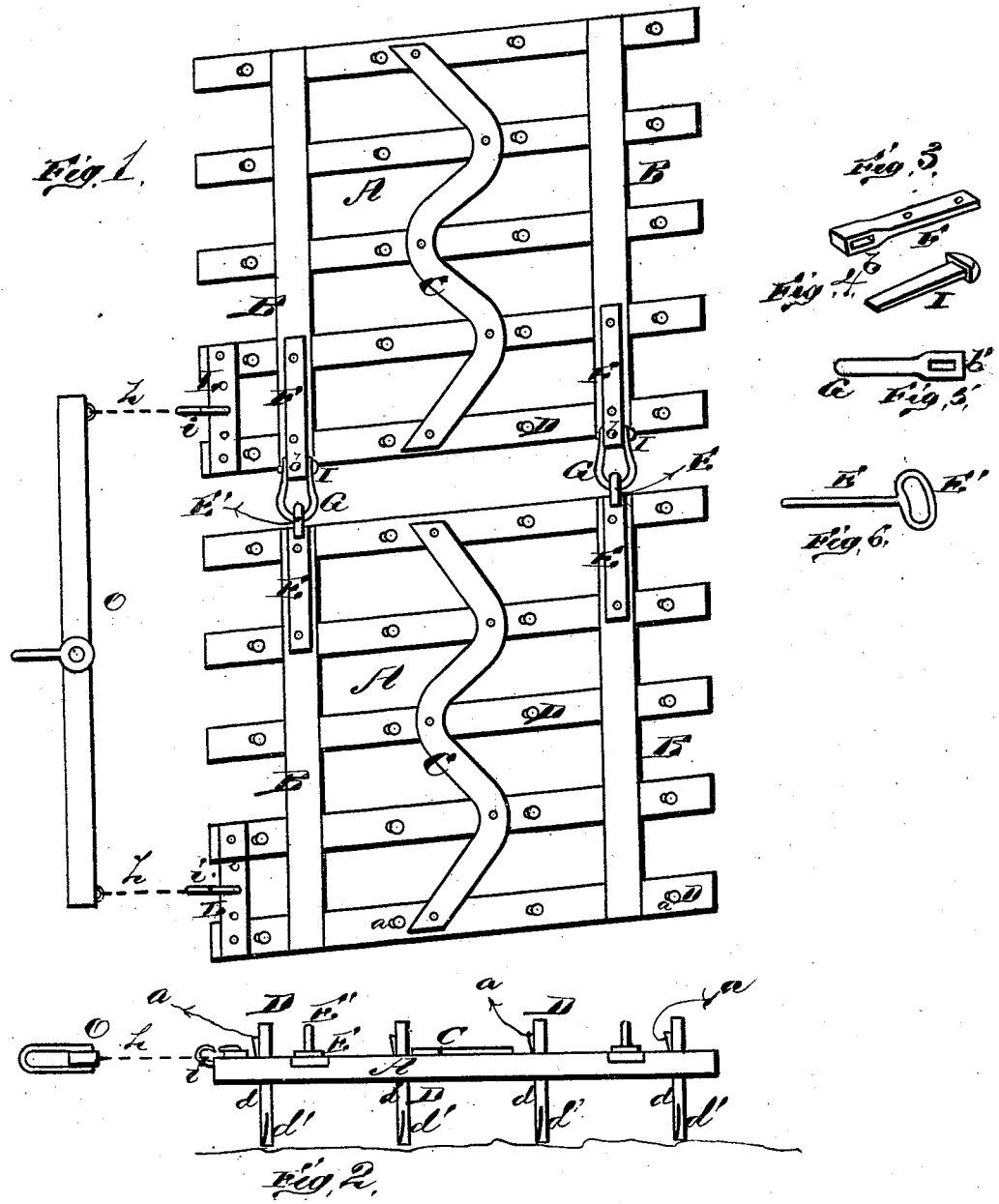

SAMUEL ELLIOTT, OF LITHGOW, NEW YORK.

IMPROVEMENT IN HARROWS.

Specification forming part of Letters Patent No. 207,725, dated September 3, 1878; application filed April 27, 1878.

*To all whom it may concern:*

Be it known that I, SAMUEL ELLIOTT, of Lithgow, in the county of Dutchess and State of New York, have invented a new and valuable Improvement in Harrows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my harrow. Fig. 2 is a side view. Figs. 3 and 4 are perspective details, and Figs. 5 and 6 are detail views thereof.

The nature of my invention consists in the construction and arrangement of a harrow, as will be hereinafter more fully set forth.

The annexed drawings, to which reference is made, fully illustrate my invention.

My harrow is made in two parts, each part consisting of a series of parallel bars, A A, connected by two cross-bars, B B, a suitable distance from the front and rear ends, as shown. The bars A A, in each half of the harrow, are further connected by a brace, C, extending centrally between the cross-bars from side to side, and is made in serpentine form, as shown, whereby greater strength is obtained, as the brace runs alternately backward and forward. By arranging this serpentine brace C in the center, or nearly so, of the harrow-frame, a double bracing is secured—to wit, a central and a zigzag or diagonal.

D D represent the teeth, which are passed through holes in the bars A, and are adjusted up and down, as required, and secured by means of wedge-shaped keys $a\ a$, driven into said holes in front of the teeth.

The two parts of the harrow are connected by the following means: On the cross-bars B of one part are secured straps E, which terminate in rings or eyes E', standing vertically beyond the side of the harrow. On the cross-bars of the other harrow are secured straps F F, the outer ends of which form flattened eyes $b\ b$. A clevis, G, is passed through each ring E', the ends of said clevis also forming flattened eyes, $b'\ b'$, to correspond with the eyes $b$ of the corresponding strap F. A flat key or pin, I, is passed through said eyes, to form the connection, whereby a stiff joint is formed that will prevent the harrow or one part of it from riding or hitching on top of the other. At the front left-hand corner of each harrow are short perforated bars L L, in which the hooks $i\ i$ may be adjusted laterally, and said hooks, by chains $h\ h$, connected to the double-tree O, so that the direction of the harrow can be changed for pulverizing the ground fine or coarse.

What I claim as new, and desire to secure by Letters Patent, is—

A harrow having the parallel bars A, cross-bars B, and the serpentine brace C, extending centrally across the harrow-frame, and at equal distances from the cross-bars B, substantially as shown and described.

In testimony that I claim the above I have hereunto subscribed my name in the presence of two witnesses.

SAMUEL ELLIOTT.

Witnesses:
  A. S. FANNING,
  H. W. CHAPMAN.